Patented Apr. 23, 1940

2,197,813

UNITED STATES PATENT OFFICE 2,197,813

SYNTHETIC DRYING OIL AND METHOD OF MAKING SAME

Frank A. Strauss, New Brighton, Staten Island, N. Y., assignor to Wecoline Products, Inc., Boonton, N. J., a corporation of New Jersey No Drawing. Application July 10, 1936, Serial No. 90,010

7 Claims. (Cl. 260—411)

This invention relates to coating compositions, such as paints, varnishes, enamels and printing inks. More particularly, it is directed to the use in such compositions of a synthetic drying oil having improved drying properties.

It is customary in compositions of this character to have present a drying oil having its usual function in use of absorbing oxygen from the air, changing the chemical character of the oil and forming a film by such chemical reaction, which is commonly known as "drying."

Various oils of drying or semi-drying types have been used for this purpose and among such oils are linseed oil, China-wood oil and various others. Some of these oils are inferior in quality in that they do not impart as desirable drying properties as others and such oils have been little used in high grade coating compositions.

The present invention has for its objects to provide a drying oil of a synthetic nature utilizing certain complex alcoholic compounds, particularly those having an ether linkage. Such compounds are reacted with fatty acids of drying or semi-drying oils to provide esters having improved drying properties. Even though I utilize fatty acids from inferior drying or semi-drying oils, the resulting compounds have highly desirable and improved properties. Among the alcoholic compounds which I use are the polyglycerols, particularly the di- and the tri-glycerols, and various other polyalcohols such as dehydration products of sorbitol and mannitol and the like, prepared from these alcohols by splitting off H₂O to form an ether linkage.

The ether linkages in such alcohols may be a straight linkage, as

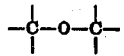

or an inner anhydride linkage, as

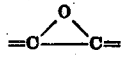

or a similar linkage in which at least one carbon atom is bridged, as

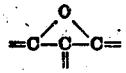

In all cases, the alcohol has at least three hydroxyl groups plus the ether linkage.

The esterification or reaction between the fatty acids and the ether-alcohol may be effected by any known means. Thus the reacting materials may be heated together under atmospheric pressure, provision being made for the removal from the reaction mixture of the water formed during the reaction, or the heating may be conducted under reduced pressure, or in a current of inert gas. The two latter procedures are often advisable when a pale color of the resulting product is desired. Simply heating the components to a suitable temperature is usually a convenient method of effecting combination, but when desired, any of the well known esterification catalysts may be added to accelerate the reaction.

The following are a few specific examples showing the application of the invention to various compounds:

Example 1

400 parts by weight 95% glycerol and two parts by weight sodium acetate are heated to 280° C. for 1½ hours and held at that temperature for 45 minutes, with a loss of 53 parts by weight. The heating is then discontinued and the charge removed. The product is a very viscous, straw-colored liquid, consisting essentially of di-glycerol (di-glyceryl ether). This product is then esterified with linseed oil fatty acids in the following manner: 500 parts by weight distilled linseed oil fatty acids and 69 parts by weight of di-glycerol are heated in a container provided with a thermometer, an inlet for carbon dioxide extending to the bottom of the container and an outlet tube for the carbon dioxide and evolved vapors near the top of the container. The mixture is heated in a stream of carbon dioxide sufficiently strong to keep the non-homogeneous mass in agitation. At about 170° C. a reaction begins, as evidenced by the evolution of water vapor. After 15 minutes of heating, a temperature of 200° C. is reached. The two liquid layers disappear, leaving a homogeneous solution and esterification becomes fairly rapid. After heating for 1 hour and 15 minutes, a temperature of 280° C. is attained and the distillation of water practically ceases, indicating that the reaction is nearly complete. The temperature is raised to 300° C. with a continuance of the stream of carbon dioxide, maintaining this temperature for 45 minutes additional. The temperature is then maintained at 300° C. for 1 hour. The reaction mixture is then allowed to cool in a stream of carbon dioxide. During the latter part of the reaction, a small amount of fatty acid distills over. The resulting product is a very pale oil, having a viscosity of about 1 poise, an odor resembling linseed oil and an acid number of about 8.5. Upon the addition of soluble metallic driers, for example, 0.3 per cent by weight of a lead compound calculated as metal, and 0.03 per cent by weight of cobalt, the oil may be flowed on an inclined surface, where it dries to a tough, elastic film in about 4 hours under ordinary conditions. The oil is suitable for use in the manufacture of paints and enamels and can be blended with other materials and processed by means well known to the drying oil art for the production of varnishes.

Example 2

500 parts by weight of glycerine and 2.5 parts by weight sodium acetate, are heated together in the manner previously described for the preparation of di-glycerol, at 280–290° C., until the reaction mixture has lost 94.5 parts by weight. The resulting very viscous, deep straw-colored liquid is shown by analysis to be essentially tri-glycerol (tri-glyceryl di-ether). 57 parts by weight of the above described tri-glycerol and 329 parts by weight of fatty acids derived from perilla oil by splitting and subsequent distillation, are heated together in the manner described in Example 1. Esterification reaction begins at about 210° C. and is complete at about 250° C. The temperature is then raised to 300° C. and maintained with agitation by means of a carbon dioxide stream for two hours, the flask then being cooled. The resulting product is a moderately pale, exceedingly viscous oil having a drying oil odor and an acid number of about 8.5. Upon the addition of metallic driers in the proportions given in Example 1, and sufficient volatile mineral spirits to thin the oil to varnish consistency, the material dries when flowed out on an inclined surface in 1 to 2 hours at room temperature to give a smooth, tough, elastic substantially tack-free film. This material constitutes an excellent drying oil for use in enamels, or it may be processed with resins according to the usual varnish making practice to give a varnish which dries with surprisingly good speed to a hard, tough and glossy film.

Example 3

35.3 parts by weight of commercial 85% sorbitol solution in water and 280 parts by weight of perilla oil fatty acids of the type described in Example 2, are heated together in the apparatus used for esterification previously described in Examples 1 and 2. At about 100° C. slight evolution of water occurs. This evolution becomes more rapid as the temperature is raised. It is due to:

One, the distillation of the water in which the sorbitol is dissolved;

Two, the splitting out of water from the sorbitol molecules to form sorbitol ethers or inner anhydrides; and Three, the water formed by the esterification of fatty acid with the free hydroxyl groups of the ethers or anhydrides.

The temperature is gradually raised to 235° C. At this temperature the two liquid layers disappear and the solution becomes homogeneous except for a few suspended particles and smudges of charred material. The temperature is then raised to 300° C., the flow of carbon dioxide being continued, held at this temperature for two hours and then cooled. The product is a very viscous oil of medium amber color, having an acid number of 22.4. Upon the addition of metallic driers and mineral spirits as described in Example 2, the product, when flowed on an inclined surface, dries to a tough, hard and elastic film in about 1 hour at ordinary temperatures. It forms an excellent oil for use for the purpose described in Example 2.

Example 4

500 parts by weight of fatty acids derived from sunflower seed oil by splitting and distillation and 69 parts by weight of diglycerol prepared in the manner described in Example 1, are heated together in a stream of carbon dioxide in the apparatus described in the previous examples. The esterification reaction begins at about 200° C. and is completed at about 250° C. The temperature is then raised to 300° C. and maintained for 4 hours, after which the product is cooled and removed from the container. The product is a straw-colored, very viscous oil with an acid number of 7. Upon the addition of metallic driers in the proportions hereinbefore given, and of mineral spirits, it dries when flowed on an inclined surface to give a tough, elastic film in about 6 hours. This film is exceptionally light in color and retains its color both in the dark and in the light, under conditions which cause films prepared from natural drying oils of equal drying ability to yellow badly. White enamels prepared with this oil are of exceptionally pale color and retain their color well on baking at high temperatures and on exposed to darkness and moisture. The oil can be blended or cooked with resins in accordance with normal varnish making practice to give varnishes which retain to a marked degree the non-discoloring characteristics of the oil itself.

Although I have described my invention setting forth several embodiments thereof, it will, of course, be obvious that my invention is not limited by the examples but is of broader scope. Various changes may be made in my invention, as for example, the drying properties of the compounds may be improved by heating the fatty acids used for a definite period of time in order to increase the viscosity thereof or to cause bodying. The new synthetic drying oils may be used to the exclusion of the natural drying oils, or may be used in admixture therewith. It is even possible to start with a natural drying oil having a substantial amount of free fatty acids and react the same with the ether alcohol to obtain a mixed drying oil. In order to produce the ether alcohol, it is not necessary that glycerol be reacted with itself, but it may be reacted with other alcohols, such as the glycols. In place of sorbitol or mannitol, other alcohols of similar or analogous composition may be used. The production of the ether alcohol from the alcohol may take place either prior to the reaction with the fatty acids or simultaneously therewith. These and other changes in the details of the operation of my invention may be made without departing from the principles set forth herein, and the invention is to be broadly construed and not to be limited except by the claims appended hereto.

What I claim is:

1. Liquid esters of natural higher fatty acids obtained by the hydrolysis of a glyceride oil taken from the class consisting of unhydroxylated drying and semi-drying and an open chain aliphatic alcohol having an internal ether linkage and at least three hydroxyl groups, said esters being substantially free from uncombined hydroxyl groups and having drying properties superior to those of the natural glyceride oil from which said fatty acids were obtained.

2. Liquid esters of natural higher fatty acids obtained by the hydrolysis of a glyceride oil taken from the class consisting of linseed, Chinawood, perilla, soya bean and sunflower seed and an open chain aliphatic alcohol having an internal ether linkage and at least three hydroxyl groups, said esters being substantially free from uncombined hydroxyl groups and having drying properties superior to those of the natural glyceride oil from which said fatty acids were obtained.

3. Liquid esters of natural higher fatty acids obtained by the hydrolysis of a glyceride oil taken from the class consisting of unhydroxylated drying and semi-drying and an open chain aliphatic alcohol having an internal ether linkage and at least three hydroxyl groups taken from the class consisting of diglycerol, triglycerol, mannitol ether and sorbitol ether, said esters being substantially free from uncombined hydroxyl groups and having drying properties superior to those of the natural glyceride oil from which said fatty acids were obtained.

4. Bodied liquid esters of natural higher fatty acids obtained by the hydrolysis of a glyceride oil taken from the class consisting of unhydroxylated drying and semi-drying and an open chain aliphatic alcohol having an internal ether linkage and at least three hydroxyl groups, said esters being substantially free from uncombined hydroxyl groups and having drying properties superior to those of the natural glyceride oil from which said fatty acids were obtained.

5. Liquid esters of natural higher fatty acids obtained by the hydrolysis of perilla oil and an open chain aliphatic polyglycerol, said esters being substantially free from uncombined hydroxyl groups and having drying properties superior to those of perilla oil.

6. Liquid esters of natural higher fatty acids obtained by the hydrolysis of soya bean oil and an open chain aliphatic polyglycerol, said esters being substantially free from uncombined hydroxyl groups and having drying properties superior to those of soya bean oil.

7. Liquid esters of natural higher fatty acids obtained by the hydrolysis of linseed oil and an open chain aliphatic polyglycerol, said esters being substantially free from uncombined hydroxyl groups and having drying properties superior to those of linseed oil.

FRANK A. STRAUSS.